No. 830,721. PATENTED SEPT. 11, 1906.
G. W. KING, H. J. BARNHART & C. B. KING.
STEERING MECHANISM FOR SELF PROPELLING MACHINES.
APPLICATION FILED SEPT. 10, 1904.
5 SHEETS—SHEET 1.
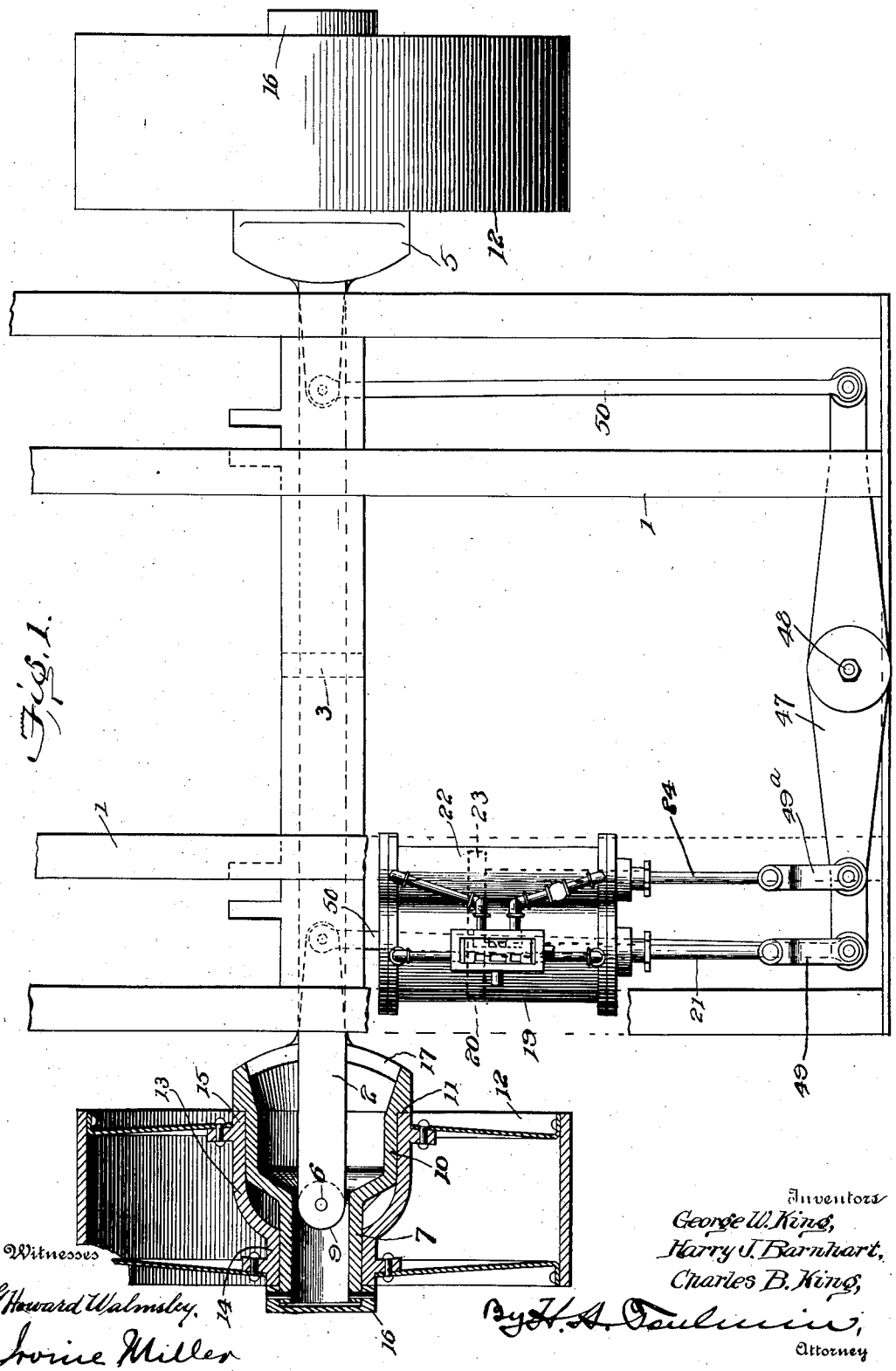
Witnesses
G. Howard Walmsley
Irvine Miller
Inventors
George W. King,
Harry J. Barnhart,
Charles B. King,
By H. A. Toulmin,
Attorney

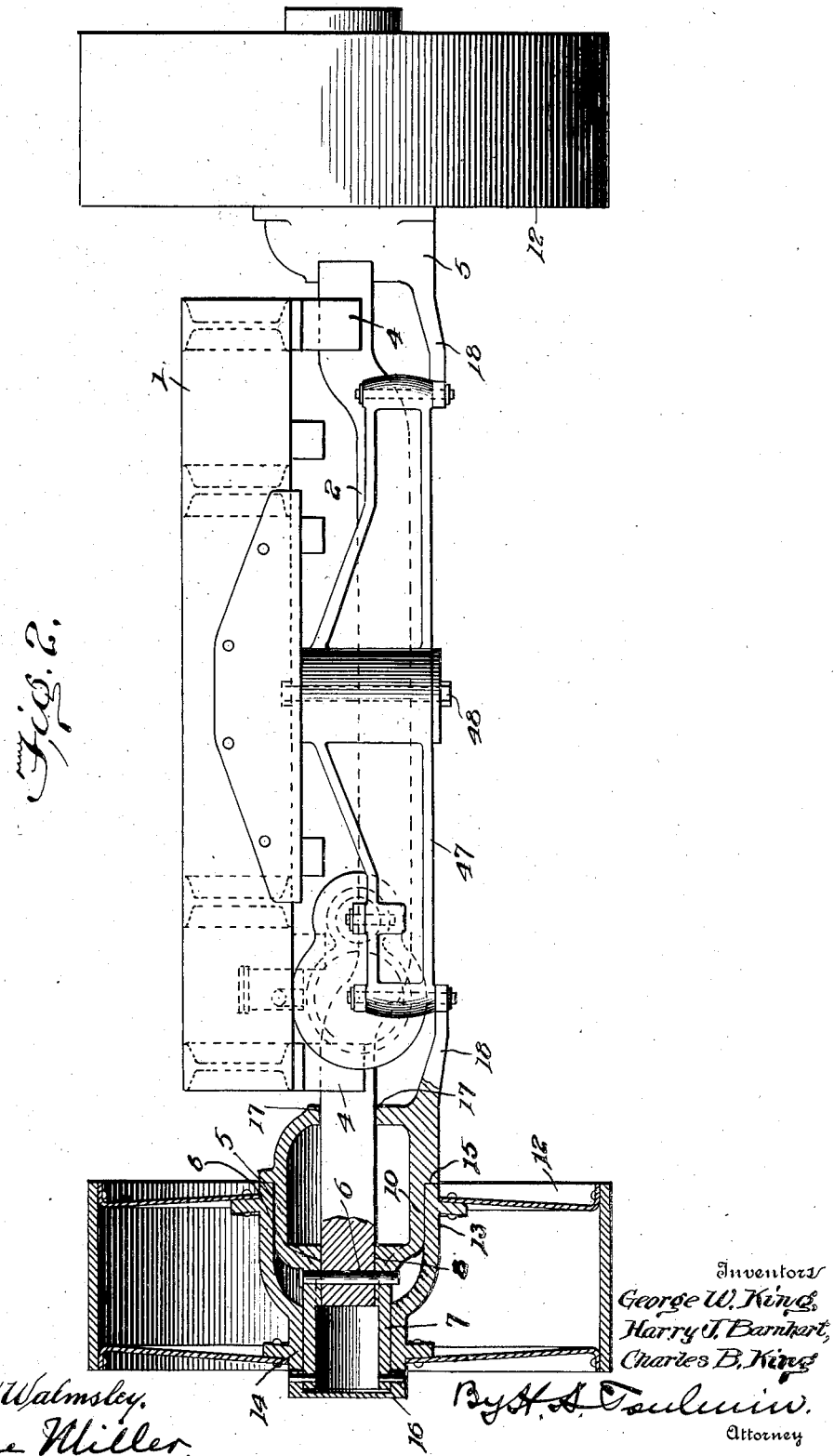

No. 830,721. PATENTED SEPT. 11, 1906.
G. W. KING, H. J. BARNHART & C. B. KING.
STEERING MECHANISM FOR SELF PROPELLING MACHINES.
APPLICATION FILED SEPT. 10, 1904.
5 SHEETS—SHEET 3.
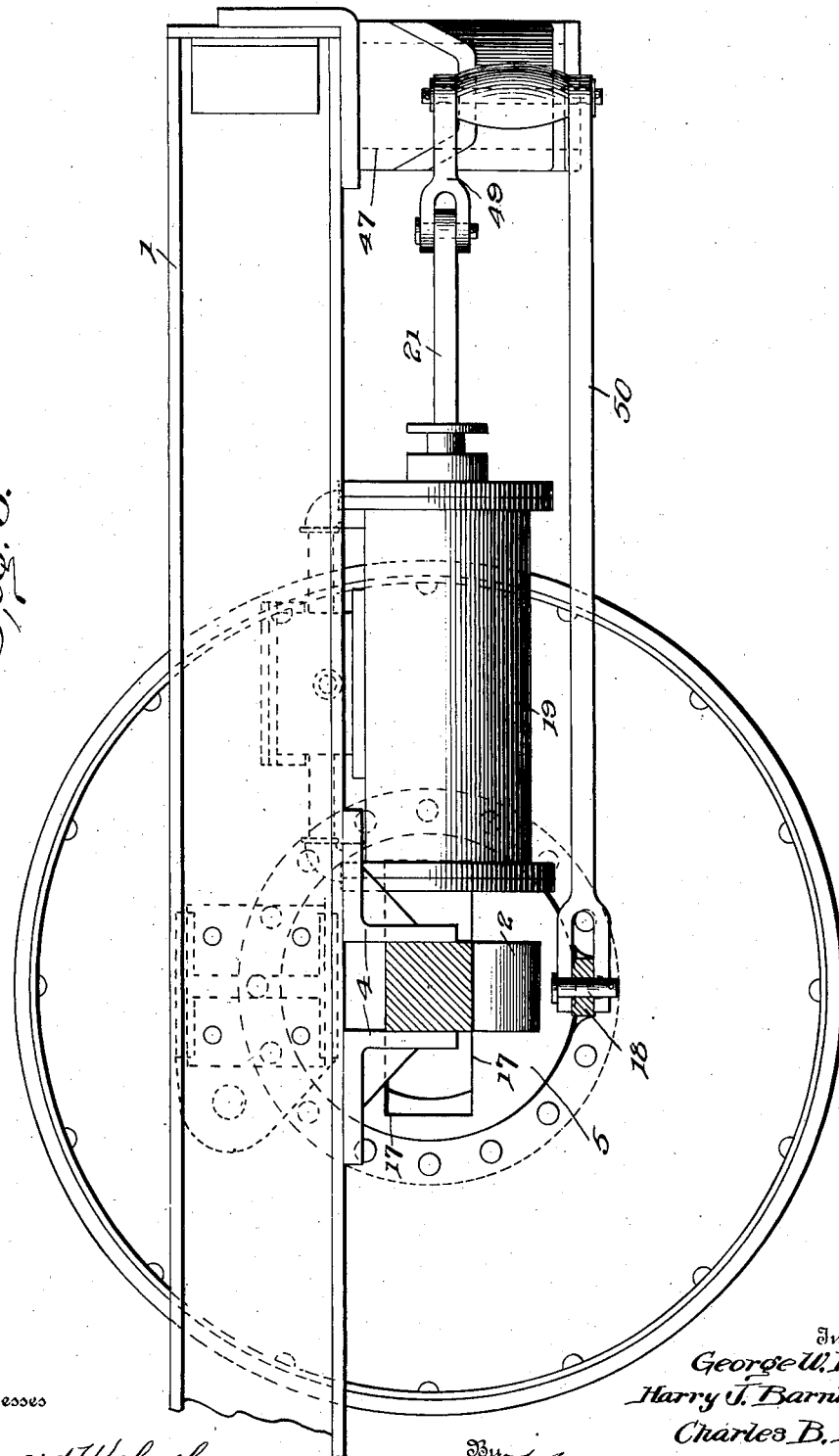

No. 830,721. PATENTED SEPT. 11, 1906.
G. W. KING, H. J. BARNHART & C. B. KING.
STEERING MECHANISM FOR SELF PROPELLING MACHINES.
APPLICATION FILED SEPT. 10, 1904.
5 SHEETS—SHEET 4.
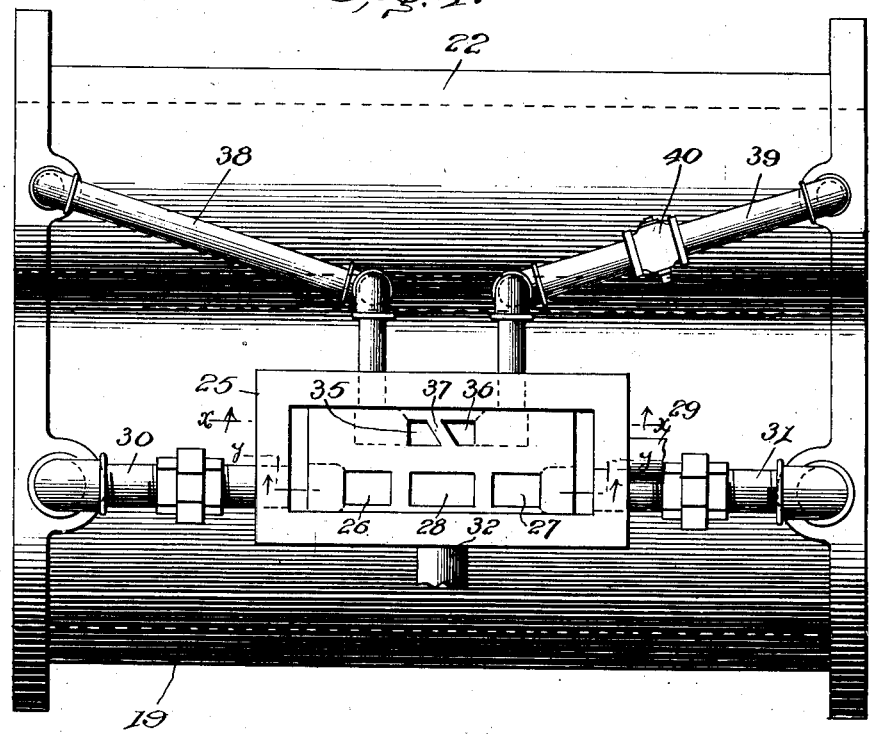
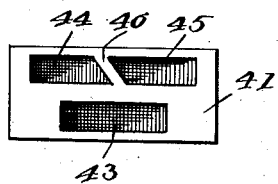
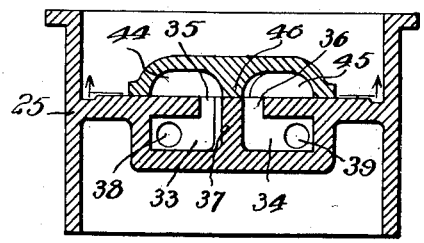
Witnesses
G. Howard Walmsley.
Irvine Miller.
Inventors
George W. King,
Harry J. Barnhart,
Charles B. King,
By
H. A. Toulmin,
Attorney No. 830,721. PATENTED SEPT. 11, 1906.
G. W. KING, H. J. BARNHART & C. B. KING.
STEERING MECHANISM FOR SELF PROPELLING MACHINES.
APPLICATION FILED SEPT. 10, 1904.
5 SHEETS—SHEET 5.
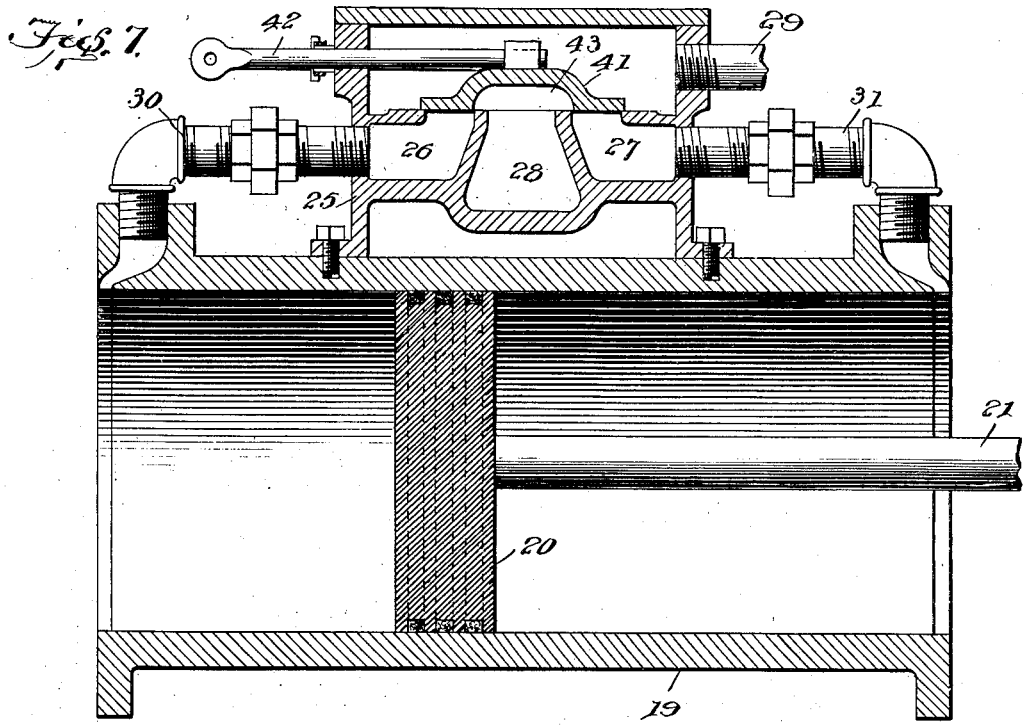
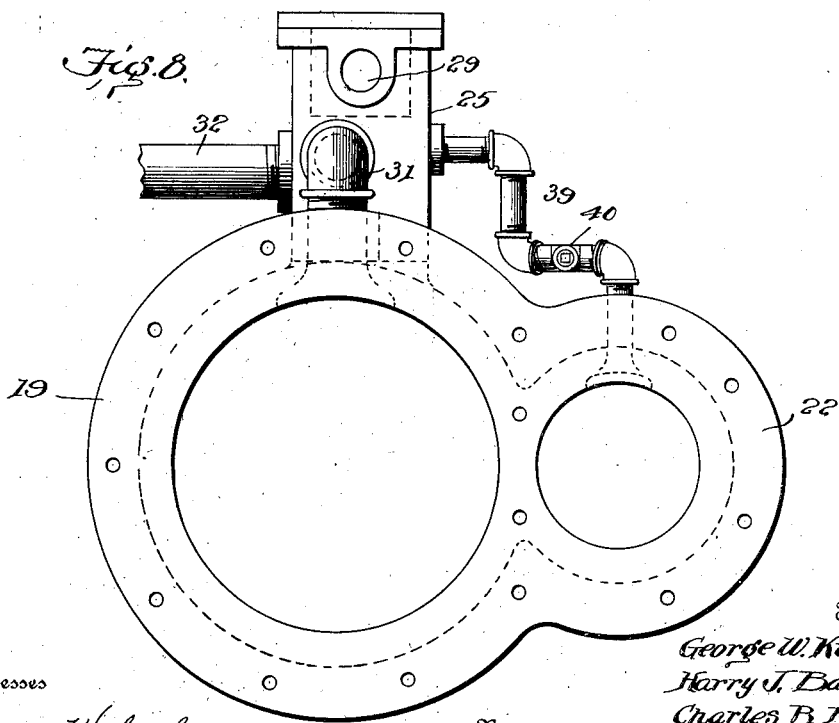
Witnesses
G. Howard Walmsley.
Irvine Miller.
Inventors
George W. King,
Harry J. Barnhart,
Charles B. King,
By
H. A. Toulmin
Attorney

UNITED STATES PATENT OFFICE.

GEORGE W. KING, HARRY J. BARNHART, AND CHARLES B. KING, OF MARION, OHIO, ASSIGNORS TO THE MARION STEAM SHOVEL COMPANY, OF MARION, OHIO.

STEERING MECHANISM FOR SELF-PROPELLING MACHINES.

No. 830,721.      Specification of Letters Patent.      Patented Sept. 11, 1906.

Application filed September 10, 1904. Serial No. 223,969.

*To all whom it may concern:*

Be it known that we, GEORGE W. KING, HARRY J. BARNHART, and CHARLES B. KING, citizens of the United States, residing at Marion, in the county of Marion and State of Ohio, have invented certain new and useful Improvements in Steering Mechanism for Self-Propelling Machines, of which the following is a specification, reference being had therein to the accompanying drawings.

This invention relates to steering mechanism for self-propelling machines, being designed for use more particularly in connection with steam-shovels of the traction type which are adapted to propel themselves over the surface of the ground or ordinary roadways as distinguished from railways. The invention is, however, capable of application to structures other than steam-shovels.

Our invention consists in certain novel features, which we will now proceed to describe and will then particularly point out in the claims.

In the accompanying drawings, Figure 1 is a plan view of a structure embodying our invention in one form, the same being partly broken away and partly in horizontal section. Fig. 2 is an end elevation, partly in vertical section. Fig. 3 is a side elevation with the axle in section and one of the wheels removed. Fig. 4 is a plan view of the cylinders with the valve-chest top and valve removed. Fig. 5 is a view of the under or working face of the valve. Fig. 6 is a sectional view of the valve and valve-chest, taken along a line corresponding to the line $x\ x$ of Fig. 4 and looking in the direction of the arrows. Fig. 7 is a sectional view through the valve-chest, valve, and cylinder, taken on a line corresponding to the line $y\ y$ of Fig. 4 and looking in the direction of the arrows; and Fig. 8 is an end elevation of the cylinders and their associated parts with the cylinder-heads removed.

Referring to the said drawings, 1 indicates the frame of a steam-shovel or other self-propelling machine or vehicle, and 2 indicates the steering-wheel axle, which is centrally pivoted to the main frame by means of a horizontal pivot 3 (indicated in dotted lines in Fig. 1) and extending longitudinally of the machine. The axle is preferably square in cross-section, as shown, and the body 1 is provided at each side with brackets 4, between which the axle passes and is free to play vertically. By reason of this construction the axle is free to tilt on its longitudinal pivot, but is at the same time firmly supported in a fixed transverse plane and is therefore free to adapt itself to inequalities of the ground or roadway without becoming displaced from its true transverse position. On each end of the axle there is swiveled a journal or sleeve 5, connected to the axle by a vertical pivot-pin 6, which lies in the central vertical plane of the wheel when this latter is in position on the journal. The journal 5 is provided on its outer part with a bearing-sleeve 7 of relatively small diameter, and said sleeve is provided at its inner end with flat horizontal bearing-surfaces 8, which fit and bear, respectively, on the flat upper and under sides of the end of the axle, as shown in Fig. 2. The extremity of the axle is preferably rounded off, as indicated at 9, to permit a sufficient range of motion of the journal around its pivot. From this point inward the journal increases in diameter, forming a second bearing-sleeve 10 of larger diameter than the bearing-sleeve 7 and terminating in a shoulder 11, against which the inner end of the hub of the wheel abuts.

The wheel (indicated as a whole by the reference-numeral 12 is provided with a hub 13, having a reduced portion 14 to fit the sleeve 7 and an enlarged portion 15 to fit the sleeve 10 and abut against the shoulder 11. The wheel is held in position on the journal by means of a terminal cap 16. The enlarged inner end of the journal is provided with a transverse horizontal slot, with bearing-surfaces 17 at the top and bottom thereof to fit upon the flat upper and under sides of the axle as it issues from the journal. The journal is provided with an arm or extension 18, preferably on the lower portion of its inner end, by means of which the steering power is applied to the journal, so as to turn upon the pivot 6.

It will be noted that the pivotal axis of each steering-wheel lies in the central plane of the wheel, so that said wheel may be readily turned without rotating it or causing it to travel over the ground in such a way as to change its position, as is the case where the pivotal axis is eccentric to the wheel. It will also be observed that the wheel is firmly supported on the axle by reason of the bearing-surfaces of the journal fitting on and bearing against the flat upper and under surfaces of the axle, so that the wheel cannot wabble or depart from a plane of rotation at right angles to the axle. Furthermore, the wheel is firmly supported on the journal by reason of its two bearings at the extremities of the hub.

Our present invention relates more particularly to the means whereby the position of the wheels is controlled for the purpose of steering the vehicle, and this mechanism we shall now proceed to describe. It comprises a steam-cylinder 19, in which is located a piston 20, provided with a piston-rod 21.

22 indicates a second cylinder, preferably cast in one piece with the cylinder 19 and containing a non-compressible fluid, such as oil or the like. This cylinder also contains a piston, (indicated in dotted lines at 23 in Fig. 1,) said piston having a piston-rod 24, which is so connected to the piston-rod 21 as to move in unison therewith.

25 indicates a valve-chest, which is preferably mounted on top of the cylinder 19, said valve-chest being provided on one side of its central longitudinal plane with cylinder-ports 26 and 27 and an intermediate exhaust-port 28. Steam is admitted to the upper part of the valve-chest from any suitable source, such as the boiler of the steam-shovel, by means of a pipe 29. A pipe or conduit 30 leads from the port 26 to one end of the cylinder 19, and a pipe 31 leads from the port 27 to the other end of the cylinder 19.

32 indicates an exhaust-pipe, connected with the exhaust-port 28. On the other side of its central longitudinal plane the valve-chest is provided with two chambers 33 and 34, having ports 35 and 36, respectively, separated by a wall or partition 37, which is preferably inclined or diagonal, as shown. The chamber 33 is connected by a pipe or conduit 38 with one end of the cylinder 22, and the chamber 34 is connected with the other end of said cylinder 22 by a pipe or conduit 39. In one of these pipes there is provided a controlling-valve 40, by means of which the flow of the oil or other liquid may be regulated, as desired. Within the valve-chamber is located a slide-valve 41, which is held down to its seat by means of the pressure of the steam above it and which is provided with a valve-stem 42, through which it may be moved to any desired position through the medium of any suitable operating mechanism. This valve is provided on its under or working face with a port or passage 43 in the form of a groove or recess, lying on the same side of the central longitudinal plane of the valve as the ports 26, 27, and 28, so that the movement of the valve in either direction from the central position (shown in Fig. 7) will place one or the other of the cylinder-ports 26 and 27 in connection with the live-steam supply, at the same time connecting the other one of said ports with the exhaust-port 28. In this way the piston 20 may be made to move in either direction and to any desired position within the cylinder 19. The valve 41 is further provided on that side of its under face lying on the other side of its central longitudinal plane with two ports or recesses 44 and 45, registering, respectively, with the ports 35 and 36 and separated by a partition 46, which is preferably inclined in a direction the reverse of the inclination of the partition 37. When the valve 41 is in the central or locking position, (shown in Figs. 6 and 7,) the two partitions 37 and 46 register in such a way as to cut off all communication between the chambers 33 and 34, and consequently all communication between the opposite ends of the cylinder 22. In this position of the parts the non-compressible fluid prevents all movement of the piston, and since the steam-piston 20 is so connected to the piston 23 as to move only in unison with it it will be seen that the steam-piston is also positively locked and that it may be locked in any position to which it may be moved within the cylinder 19 by bringing the valve 41 to the locking position. (Shown in Figs. 6 and 7.) Movement of the valve 41 in either direction, so as to supply live steam to either end of the steam-cylinder, will at the same time open up communication between the chambers 33 and 34, and thus permit both pistons to move as desired. The diagonal arrangement of the partitions 37 and 46 insures the opening of this communication at the very beginning of the valve movement simultaneously with the admission of steam to the steam-cylinder. It will further be seen that the locking of the steam-piston and the unlocking of the same are automatically performed by the same movement of the valve which cuts off or opens up the supply of steam.

The transmission of the movement of the piston 20 to the steering-wheels may be effected in any desired manner; but we prefer for this purpose the construction which we have devised and which is shown in the accompanying drawings. It comprises a horizontal steering beam or lever 47, centrally pivoted on a vertical pivot 48 on the under side of the frame or body 1. To one end of this lever the steam-piston rod 21 is connected by a link 48, the piston-rod 24 being connected to the same end of the lever by a link 49, this connection being in the present instance the means whereby the pistons 20 and 23 are caused to move in unison. Each end of the lever 47 is connected to the arm 18 of the corresponding steering-wheel by a connecting bar or rod 50, and in this way the movements of the steam-piston 20 effectually control the positions of the steering-wheels 12.

Having thus fully described our invention, what we claim as new, and desire to secure by Letters Patent, is—

1. The combination, with a steam cylinder and piston, of a liquid cylinder and piston, said pistons being connected to move together, a conduit connecting the ends of the liquid-cylinder, and a single reciprocating valve having ports on the opposite sides of the longitudinal center thereof controlling the steam-supply and the flow of liquid through said conduit respectively, whereby both are simultaneously opened and closed, substantially as described.

2. The combination, with a steam cylinder and piston, of a liquid cylinder and piston, said pistons being connected to move together, a conduit connecting the ends of the liquid-cylinder, a single reciprocating valve having ports on the opposite sides of the longitudinal center thereof controlling the steam-supply and said conduit respectively, whereby both are simultaneously opened and closed, and a separate valve for regulating the flow of liquid through said conduit, substantially as described.

3. The combination, with a steam-cylinder, a piston therein, and a piston-rod connected to the part to be controlled, of a second cylinder containing a non-compressible liquid, a piston in said liquid-cylinder having a rod connected to the steam-piston rod so as to cause the two pistons to move together, a steam-supply connected to both ends of the steam-cylinder, a conduit connecting the ends of the liquid-cylinder, and a single reciprocating valve having ports on the opposite sides of the longitudinal center thereof controlling both the steam-supply and the liquid-conduit, whereby said conduit is closed when the steam-supply is cut off and opened when the steam-supply is opened to either end of the steam-cylinder, substantially as described.

4. The combination, with a steam-cylinder, a piston therein and a piston-rod connected to the part to be controlled, of a second cylinder containing a non-compressible liquid, a piston in said liquid-cylinder having a rod connected to the steam-piston rod so as to cause the two pistons to move together, a steam-supply connected to both ends of the steam-cylinder, a conduit connecting the ends of the liquid-cylinder, a single reciprocating valve having ports on the opposite sides of the longitudinal center thereof controlling both the steam-supply and the liquid-conduit, whereby said conduit is closed when the steam-supply is cut off and opened when the steam-supply is opened to either end of the steam-cylinder, and a second valve regulating the rate of flow of the liquid through said conduit, substantially as described.

5. The combination, with a steam-cylinder, a piston therein, and a piston-rod connected to the part to be controlled, of a second cylinder containing a non-compressible liquid, a piston in said liquid-cylinder having a rod connected to the steam-piston rod so as to cause the two pistons to move together, a valve-chest having a steam supply and exhaust, steam-passages leading to the ends of the steam-cylinder, a liquid-conduit connecting the ends of the liquid-cylinder, and a single reciprocating valve having ports on the opposite sides of the longitudinal center thereof, one of said ports being adapted to connect the steam-supply with either end of the steam-cylinder and the exhaust with the other end of the steam-cylinder, and also to close the steam-supply to the cylinder, the other port of said valve controlling the liquid-conduit, closing the same when the steam-supply is closed and opening the same when the steam-supply is opened in either direction, substantially as described.

6. The combination, with a steam cylinder and piston and a liquid cylinder and piston, the two pistons connected to move together, of a valve-chest having a steam-supply above the valve, cylinder-ports and an intermediate exhaust-port on one side of the valve-seat, said cylinder-ports connected respectively to the two ends of the steam-cylinder, two ports on the other side of the valve-seat, connected respectively to the end of the liquid-cylinder, and a slide-valve having ports or passages in the form of recesses in its under face, one side of said valve controlling the steam-ports, whereby both cylinder-ports may be closed, or either cylinder-port may be connected with the steam-supply and the other cylinder-ports with the exhaust, the other side of the valve controlling the liquid-ports, whereby communication is established between said liquid-ports when steam is admitted to the steam-cylinder and cut off when steam is cut off from the steam-cylinder, substantially as described.

7. The combination, with a steam-cylinder and piston and a liquid cylinder and piston, the two pistons connected to move together, of a valve-chest having a steam-supply above the valve, cylinder-ports and an intermediate exhaust-port on one side of the valve-seat, said cylinder-ports connected respectively to the two ends of the steam-cylinder, two ports on the other side of the valve-seat, connected respectively to the ends of the liquid-cylinder, and a slide-valve having ports or passages in the form of recesses in its under face, one side of said valve controlling the steam-ports, whereby both cylinder-ports may be closed, or either cylinder-port may be connected with the steam-supply and the other port with the exhaust, the other side of the valve controlling the liquid-ports, whereby communication is established between said liquid-ports when steam is admitted to the steam-cylinder and cut off when steam is cut off from the steam-cylinder, the liquid-ports of the valve-seat being separated by a diagonal partition and the coöperating valve-ports being separated by a similar partition of reverse inclination, substantially as described.

8. In a mechanism of the character described, a valve-chest having a valve-seat in one side whereof are formed two cylinder-ports and an intermediate exhaust-port, said valve-seat having in the other side two liquid-ports separated by a diagonal partition, in combination with a steam-supply above the valve, and a slide-valve adapted to close both cylinder-ports when central and having a port or recess in one side of its under face, whereby, when said valve is moved in either direction from its central position, it will open one of the cylinder-ports to the steam-supply and connect the other cylinder-port with the exhaust-port, said valve having in the other side of its under face two ports or recesses separated by a partition having an inclination the reverse of that of the coöperating valve-seat partition, whereby communication is cut off between the liquid-ports when the valve is central and opened as soon as the valve is moved from its central position, substantially as described.

9. Two cylinders, one for steam and the other for a non-compressible liquid, pistons in said cylinders connected to move together, a valve-chest, a reciprocating valve therein having ports on the opposite sides of the longitudinal center thereof, one of said ports controlling the admission and distribution of steam to the steam-cylinder, and a liquid-conduit connecting the ends of the liquid-cylinder through said valve-chest, the other port of said valve controlling said liquid-conduit whereby said conduit is closed when steam is shut off from the steam-cylinder, substantially as described.

10. Parallel steam and liquid cylinders arranged side by side, having pistons and piston-rods connected to the same moving part so as to move together, a liquid-conduit connecting the ends of the liquid-cylinder, and a reciprocating valve having ports on the opposite sides of the longitudinal center thereof simultaneously controlling the supply of steam to the steam-cylinder and the passage of liquid through said liquid-conduit, substantially as described.

In testimony whereof we affix our signatures in presence of two witnesses.

GEORGE W. KING.
HARRY J. BARNHART.
CHARLES B. KING.

Witnesses:
ROBERT G. LUCAS,
WILLIAM R. SHISLER.